United States Patent
Han et al.

(10) Patent No.: US 11,307,351 B2
(45) Date of Patent: Apr. 19, 2022

(54) APPARATUS AND METHOD FOR SHAPING OPTICAL WAVEFORM

(71) Applicant: ELECTRONICS AND TELECOMMUNICATIONS RESEARCH INSTITUTE, Daejeon (KR)

(72) Inventors: Sang-Pil Han, Daejeon (KR); Minhyup Song, Daejeon (KR); Sungil Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 194 days.

(21) Appl. No.: 16/704,931

(22) Filed: Dec. 5, 2019

(65) Prior Publication Data

US 2020/0183084 A1    Jun. 11, 2020

(30) Foreign Application Priority Data

Dec. 7, 2018 (KR) .................. 10-2018-0157618
Nov. 12, 2019 (KR) .................. 10-2019-0144121

(51) Int. Cl.
 G02B 6/12 (2006.01)
 G02B 27/12 (2006.01)
 H04J 14/02 (2006.01)

(52) U.S. Cl.
 CPC ....... *G02B 6/12019* (2013.01); *G02B 27/123* (2013.01); *G02B 2006/12102* (2013.01); *H04J 14/0212* (2013.01)

(58) Field of Classification Search
 CPC .................................. G02B 6/12019
 See application file for complete search history.

(56) References Cited

U.S. PATENT DOCUMENTS

| | | | |
|---|---|---|---|
| 5,056,912 A | * | 10/1991 | Hamada et al. |
| 5,526,171 A | * | 6/1996 | Warren .................. G02F 1/11 359/245 |
| 6,724,783 B2 | * | 4/2004 | Jalali .................. H04B 10/503 372/25 |

(Continued)

FOREIGN PATENT DOCUMENTS

| JP | 4505313 B2 | 7/2010 |
|---|---|---|
| KR | 1020020046339 A | 6/2002 |
| KR | 20140018281 A | 2/2014 |

OTHER PUBLICATIONS

He et al., Switchable Pancharatnam-Berry microlens array with nano-imprinted liquid crystal alignment, vol. 43, No. 20/Oct. 15, 2018 / Optics Letters (Year: 2018).*

(Continued)

*Primary Examiner* — Peter Radkowski
(74) *Attorney, Agent, or Firm* — Rabin & Berdo, P.C.

(57) ABSTRACT

Provided are an optical waveform shaping apparatus and an optical waveform shaping method. According to an embodiment, the optical waveform shaping apparatus includes a multiplexer/demultiplexer (D/MUX) unit demultiplexing an optical signal in which optical signals of a plurality of wavelengths are multiplexed, a micro lens system refracting the demultiplexed optical signal into a collimated beam of light, and a wavelength level controller unit shaping a waveform of the optical signal. The wavelength level controller unit includes a 2D LCoS for adjusting and reflecting an amplitude or a phase value of the demultiplexed optical signal to have a distribution that is desired for each cell, and a controller for controlling the distribution.

9 Claims, 8 Drawing Sheets

(56) References Cited

U.S. PATENT DOCUMENTS

| | | | | |
|---|---|---|---|---|
| 6,947,204 | B2* | 9/2005 | Stone | G02B 6/12021 353/31 |
| 7,245,430 | B2* | 7/2007 | Kobayashi | G02B 30/36 359/464 |
| 7,587,112 | B2 | 9/2009 | Tabuchi | |
| 8,934,774 | B2* | 1/2015 | Yi | H01Q 3/2676 398/96 |
| 9,363,582 | B2 | 6/2016 | Chu et al. | |
| 10,209,443 | B2 | 2/2019 | Kang et al. | |
| 2003/0232200 | A1* | 12/2003 | Bryan | C23C 26/00 428/446 |
| 2004/0263968 | A1* | 12/2004 | Kobayashi | G02B 30/35 359/462 |
| 2005/0041177 | A1* | 2/2005 | Watanabe | G02F 1/133526 349/64 |
| 2005/0094930 | A1* | 5/2005 | Stone | G02B 6/29395 385/16 |
| 2005/0111076 | A1* | 5/2005 | Stone | G02B 6/2931 359/298 |
| 2008/0298738 | A1* | 12/2008 | Ishikawa | G02B 6/356 385/3 |
| 2009/0073556 | A1* | 3/2009 | Bent-Gourley | G02B 30/29 359/463 |
| 2012/0200916 | A1* | 8/2012 | Bent-Gourley | H04N 13/317 359/463 |
| 2012/0328298 | A1* | 12/2012 | Yi | H01Q 3/2676 398/96 |
| 2013/0128215 | A1 | 5/2013 | Sakurai | |
| 2013/0146332 | A1* | 6/2013 | Ramakrishnan | H01L 21/288 174/250 |
| 2015/0208144 | A1* | 7/2015 | Holmes | H04Q 11/0003 398/48 |
| 2017/0052316 | A1 | 2/2017 | Kwon | |

OTHER PUBLICATIONS

Rudnick et al., One GHz Resolution Arrayed Waveguide Grating Filter with LCoS Phase Compensation, OFC 2014, Th3F.7.pdf (Year: 2014).*

Sorimoto et al., Compact and phase-error-robust multilayered AWG-based wavelength selective switch driven by a single LCOS, Jul. 15, 2013 | vol. 21, No. 14 | DOI:10.1364/OE.21.017131 | Optics Express (Year: 2013).*

Suzuki et al., Application of Waveguide/Free-Space Optics Hybrid to ROADM Device, Journal of Lightwave Technology, vol. 35, No. 4, Feb. 15, 2017 (Year: 2017).*

Xu et al., Flat-Top CWDM (De)Multiplexer Based on MZI With Bent Directional Couplers, IEEE Photonics Technology Letters, vol. 30, No. 2, Jan. 15, 2018 (Year: 2018).*

Yang et al., Small phase pattern 2D beam steering and a single LCOS design of 40 1 x 12 stacked wavelength selective switches, Opt. Express 24, 12240-12253 (2016) (Year: 2016).*

Xie et al., Rapid fabrication of thermoplastic polymer refractive microlens array using contactless hot embossing technology, Feb. 23, 2015 | vol. 23, No. 4 | DOI:10.1364/OE.23.005154 | Optics Express (Year: 2015).*

Wang et al., LCoS SLM Study and Its Application in Wavelength Selective Switch, Photonics 2017, 4, 22; doi:10.3390/photonics4020022 (Year: 2017).*

Wu et al., Fabrication of two-dimensional arrays of microlenses and their applications in photolithography, 2002 J. Micromech. Microeng. 12 747 (Year: 2002).*

Baxter et al., Highly programmable Wavelength Selective Switch based on Liquid Crystal on Silicon switching elements, in Optical Fiber Communication Conference and Exposition and The National Fiber Optic Engineers Conference, Technical Digest (CD) (Optical Society of America, 2006), paper OTuF2 (Year: 2006).*

Andrew J. Metcalf et al., "Fully programmable two-dimensional pulse shaper for broadband line-by-line amplitude and phase control", Optics Express, vol. 21, No. 23, Nov. 7, 2013.

Sang-Pil Han et al., "A Reflective Mirror with Spherical Lens Arrays for Multi-Channel Optical Interconnectors", Integrated Photonics and Nanophotonics Research and Applications, JTuB6, 2009.

Sang-Pil Han et al., "Effect of Wavelength Shift on PLC-Type WDM Directional Coupler by UV Irradiation", IEEE Photonics Technology Letters, vol. 12, No. 9, Sep. 2000.

* cited by examiner

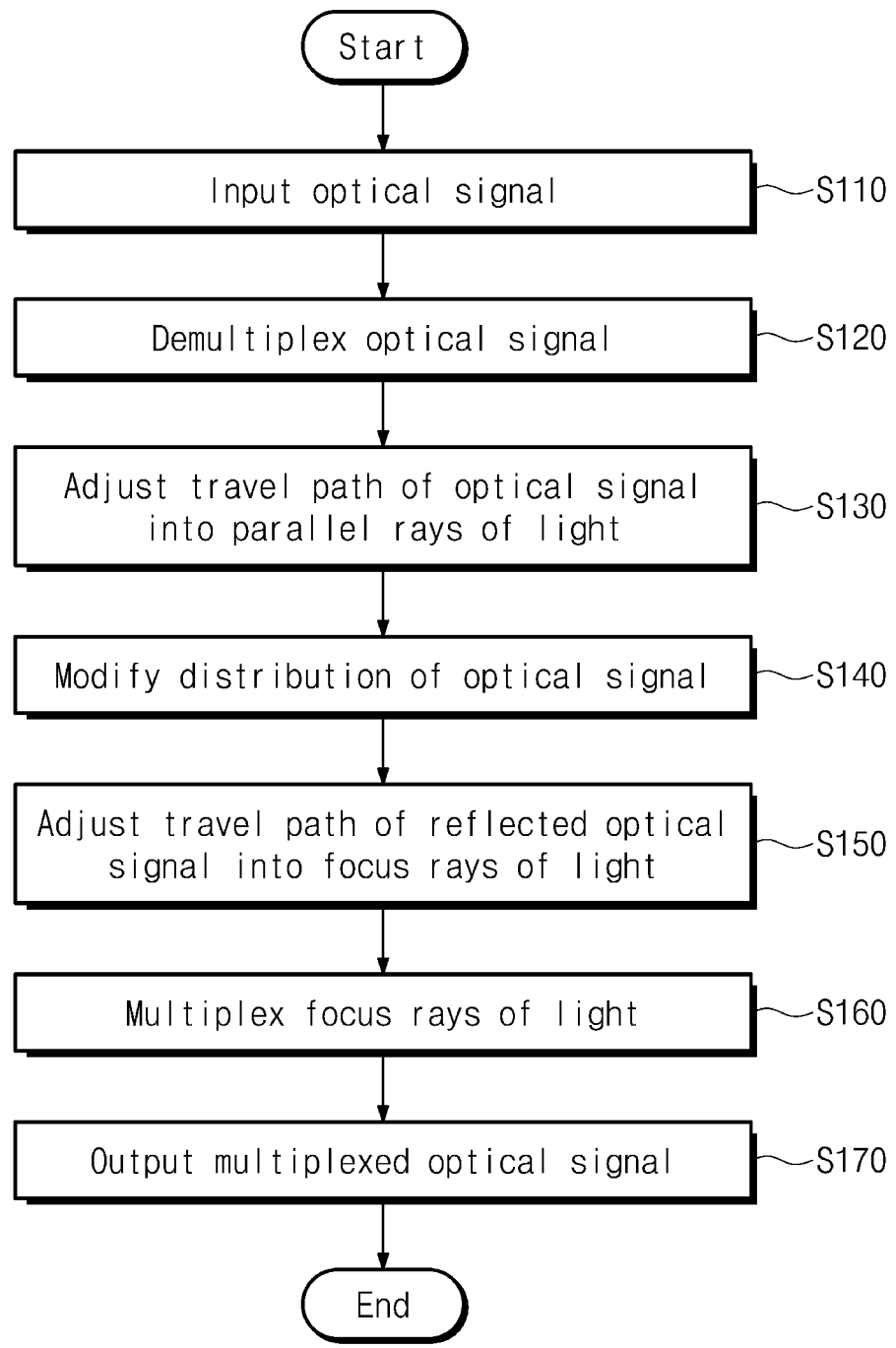

APPARATUS AND METHOD FOR SHAPING OPTICAL WAVEFORM

CROSS-REFERENCE TO RELATED APPLICATIONS

This U.S. non-provisional patent application claims priority under 35 U.S.C. § 119 to Korean Patent Application Nos. 10-2018-0157618, filed on Dec. 7, 2018, and 10-2019-0144121, filed on Nov. 12, 2019, in Korean Intellectual Property Office, the entire contents of which are incorporated herein by reference.

BACKGROUND

Embodiments relate to an optical communication system, and more particularly, relate to an optical waveform shaping apparatus and an optical waveform shaping method for regenerating an optical signal by freely adjusting an amplitude and a phase value of an optical signal.

A wavelength division multiplexing (WDM) is used as a core technology in an optical communication field. A WDM system multiplexes optical signals having multiple wavelengths through a transmitter and transmits them through one optical fiber, and demultiplexes the multiplexed optical signals for each wavelength through a receiver and outputs the demultiplexed optical signals. In this case, each of the optical signals that are demultiplexed and output may be utilized separately.

In the WDM system, when optical signals of multiple channels input to one input port are output, a wavelength selective switch (WSS) that may freely select a wavelength and a path may be used. In this case, a multi-channel optical waveform shaping apparatus may be used as a key component of the WSS. The multi-channel optical waveform shaping apparatus may be used not only for a function of the WSS having an on/off function but also for again outputting by adjusting a power level or a phase of an input signal.

For demultiplexing/multiplexing of a wavelength in the optical waveform shaping apparatus, Bragg gratings or Arrayed Waveguide Gratings (AWG) may be used. However, there is a limit in implementing channel spacing with a high resolution of 10 GHz or less when using such devices. In addition, there is a disadvantage that a size of this device is increased when the optical waveform shaping system is configured using the device.

SUMMARY

Embodiments of the inventive concept provide an optical waveform shaping apparatus and an optical waveform shaping method that have relatively high resolution.

Embodiments of the inventive concept provide an ultra-compact optical waveform shaping apparatus.

According to an exemplary embodiment, an optical waveform shaping apparatus includes a multiplexer/demultiplexer (D/MUX) unit demultiplexing an optical signal in which optical signals of a plurality of wavelengths are multiplexed, a micro lens system refracting the demultiplexed optical signal into a collimated beam of light, and a wavelength level controller unit shaping a waveform of the optical signal. The wavelength level controller unit includes a 2D LCoS (Liquid Crystal on Si) for adjusting an amplitude or a phase value of the demultiplexed optical signal to have a distribution that is desired for each cell and reflecting the adjusted optical signal, and a controller for controlling the distribution.

In an embodiment, the micro lens system is attached to an output part of the D/MUX unit.

In an embodiment, the micro lens system is attached to an input part of the 2D LCoS.

In an embodiment, the D/MUX unit includes a first D/MUX part to separate an optical multi-channel signal into a plurality of wavelength bands and to output the separated optical multi-channel signal, and a second D/MUX part in which a plurality of D/MUXs respectively corresponding to the plurality of wavelength bands are stacked, and wherein each of the D/MUXs divides and outputs the optical multi-channel signal of each wavelength band for each wavelength.

In an embodiment, the micro lens system includes a 2D micro lens array.

In an embodiment, the D/MUXs constituting the second D/MUX part are formed through a photolithography process.

In an embodiment, the D/MUXs constituting the second D/MUX part are formed by irradiating high-power pulse laser to an optical waveguide type D/MUX.

In an embodiment, the 2D micro lens array is formed through a photolithography process.

In an embodiment, the 2D micro lens array is formed through a hot embossing process.

In an embodiment, the 2D micro lens array is formed through a nano imprint process.

According to an exemplary embodiment, a method for shaping an optical waveform includes receiving, by an optical waveform shaping apparatus, an optical signal in which optical signals of a plurality of wavelengths are multiplexed, demultiplexing, by a D/MUX unit, the optical signal that is received, adjusting a travel path into a collimated beam of light by passing the demultiplexed optical signal through a micro lens system, modifying, by a wavelength level controller unit, a distribution of the optical signal, adjusting a travel path into a focused ray of light by passing the optical signal that is reflected at the wavelength level controller unit through the micro lens system, multiplexing, by the D/MUX unit, the focused ray of light, and outputting, by the optical waveform shaping apparatus, the optical signal that is multiplexed.

In an embodiment, the demultiplexing includes demultiplexing, by a first D/MUX part, the optical signal that is received, and demultiplexing, by a second D/MUX part, the optical signal that is output from the first D/MUX part.

In an embodiment, the multiplexing includes multiplexing, by a second D/MUX part, the optical signal that is incident from the micro lens system, and multiplexing, by a first D/MUX part, the optical signal that is output from the second D/MUX part.

In an embodiment, the modifying of the distribution of the optical signal includes inputting the collimated beam of light into each cell of a 2D LCoS, modifying the distribution of the optical signal, based on a distribution controlled by a controller, and reflecting the modified optical signal through the 2D LCoS.

In an embodiment, the modifying of the distribution of the optical signal based on a distribution controlled by controller includes shaping a waveform in each cell of the 2D LCoS, based on distribution information of the optical signal for the each cell of the 2D LCoS that is input to the controller.

BRIEF DESCRIPTION OF THE FIGURES

Features will become apparent to those of skill in the art by describing in detail exemplary embodiments with reference to the attached drawings in which:

FIG. 10 illustrates a flowchart describing an optical waveform shaping method according to an embodiment of the inventive concept.

DETAILED DESCRIPTION

Embodiments of the inventive concept will be described below in more detail with reference to the accompanying drawings. In the following descriptions, details such as detailed configurations and structures are provided merely to assist in an overall understanding of embodiments of the inventive concept. Modifications of the embodiments described herein can be made by those skilled in the art without departing from the spirit and scope of the inventive concept.

Figure 1:
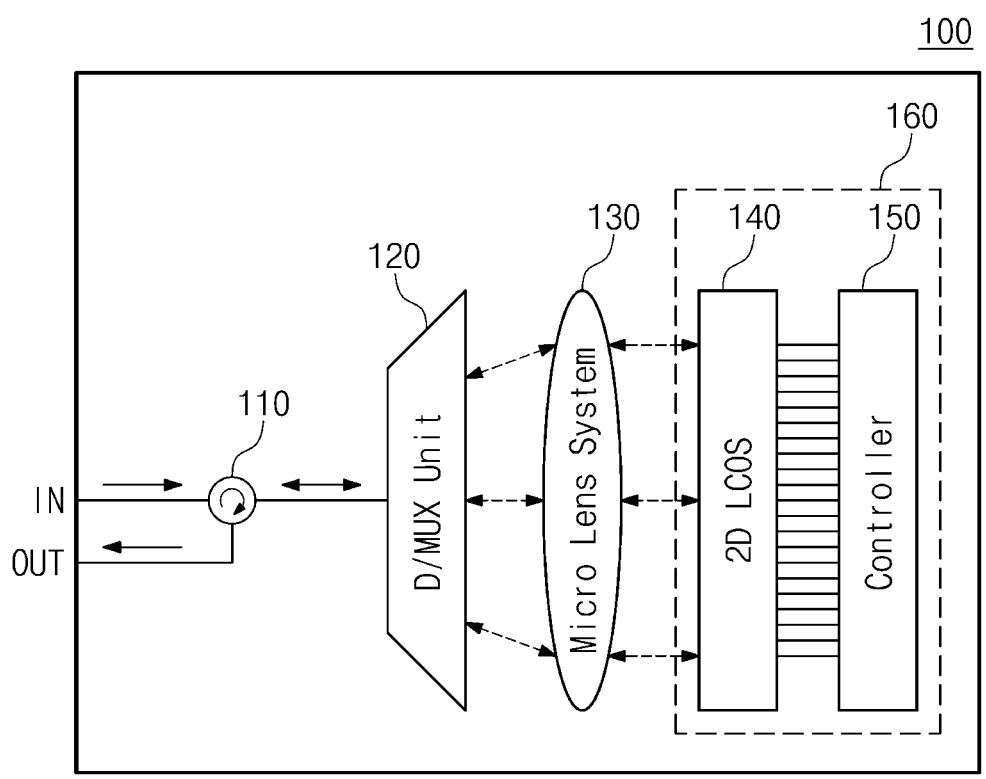
FIG. 1 illustrates a structure of an optical waveform shaping apparatus according to an embodiment of the inventive concept.

FIG. 1 illustrates a structure of an optical waveform shaping apparatus according to an embodiment of the inventive concept.

Referring to FIG. 1, an optical waveform shaping apparatus 100 according to an embodiment of the inventive concept may include a circulator 110, a multiplexer/demultiplexer unit (D/MUX unit) 120, and a micro lens system 130, and a wavelength level controller unit 160. The wavelength level controller unit 160 may include a 2D Liquid Crystal on Si (LCoS) 140 and a controller 150.

The circulator 110 may adjust a travel path of an optical signal to the D/MUX unit 120 when the optical signal is input to the optical waveform shaping apparatus 100. In this case, the circulator 110 may close a branch of an output part to prevent a leakage of the optical signal that is input. When the optical signal is output from the D/MUX unit 120, the circulator 110 may adjust the travel path of the optical signal to the output part of the optical waveform shaping apparatus 100. In this case, the circulator 110 may close the branch of an input part of the optical waveform shaping apparatus 100 to prevent the leakage of the optical signal that is output. In other words, the circulator 110 may adjust a travel direction of the optical signal input and output by opening and closing.

The D/MUX unit 120 may demultiplex the optical signal that is multiplexed and input. In addition, the D/MUX unit 120 may multiplex the optical signal that is demultiplexed and output. The D/MUX unit 120 may be based on a photonic integrated circuit (PIC). The PIC is a device that integrates multiple optical functions, and is implemented by integrating a lots of devices into a single chip to process specific complex functions. The PIC has the advantage of easy to transfer a lot of information, ultra-fast information processing and minimizing transmission loss. In addition, the PIC is easy to miniaturize the device because of a high degree of integration.

The micro lens system 130 may adjust the travel path of the optical signal to transmit the optical signal demultiplexed by the D/MUX unit 120 to the wavelength level controller unit 160. In this case, the travel path of the demultiplexed optical signal may be adjusted to a collimated beam of light through the micro lens system 130. The micro lens system 130 may adjust the travel path of the optical signal to transmit the optical signal output from the wavelength level controller unit 160 to the D/MUX unit 120. In this case, the travel path of the optical signal output from the wavelength level controller unit 160 may be adjusted into a focused ray of light through the micro lens system 130.

The wavelength level controller unit 160 may shape and reflect a waveform of the optical signal incident through the micro lens system 130. The wavelength level controller unit 160 may include the 2D LCoS 140 and the controller 150. The demultiplexed optical signal may be incident on each cell of the 2D LCoS 140 of the wavelength level controller unit 160. The optical signal incident on the each cell of the 2D LCoS 140 may be shaped into a desired distribution. The controller 150 of the wavelength level controller unit 160 may control the distribution of the 2D LCoS 140. The distribution controlled by the controller 150 may include an amplitude or a phase value of each wavelength.

According to an embodiment of FIG. 1, a wavelength multiplexed wideband optical signal having a certain distribution may enter an input port of the optical waveform shaping apparatus 100. The input optical signal may be demultiplexed and separated for the each wavelength through the D/MUX unit 120. The micro lens system 130 may refract the demultiplexed optical signal into the collimated beam of light to output. The micro lens system 130 may be attached to an output terminal of the D/MUX unit 120 or may be attached to the input part of the 2D LCoS 140. The demultiplexed optical signal may be incident on the each cell of the 2D LCoS 140. The optical signal incident on the each cell may be adjusted to have a desired distribution.

The optical signal that is adjusted to have the desired distribution may be reflected at the 2D LCoS 140. The reflected light signal may again be incident on the micro lens system 130 in the collimated beam of light. The incident collimated beam of light may be converted to the focused ray of light by the micro lens system 130 and then transmitted to the D/MUX unit 120. The D/MUX unit 120 may again wavelength-multiplex the separated optical signal and output them to the output terminal of the optical signal waveform shaping apparatus 100.

Figure 2:
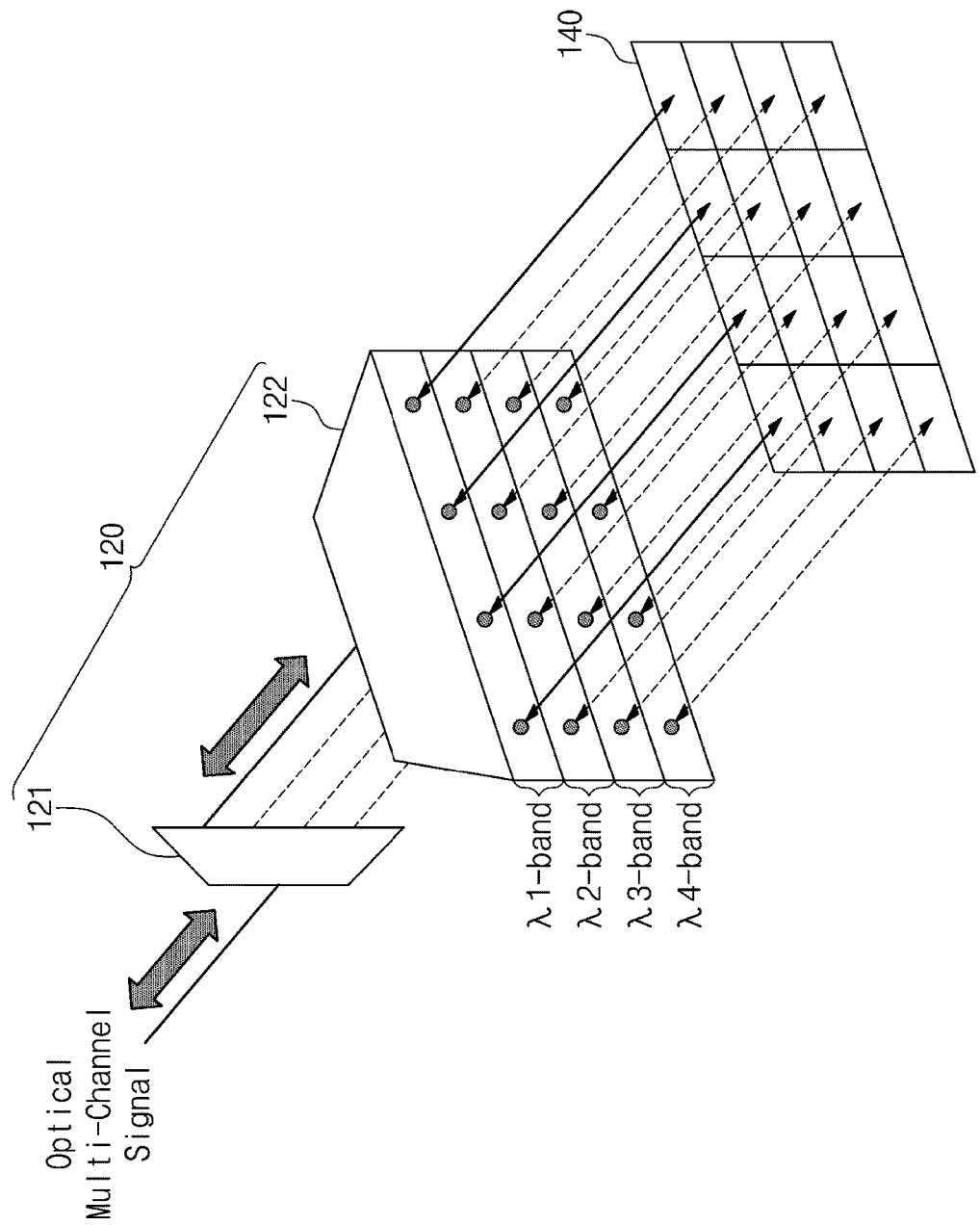
FIG. 2 illustrates a portion of the optical waveform shaping apparatus according to an embodiment of the inventive concept in more detail.

FIG. 2 illustrates a portion of the optical waveform shaping apparatus according to an embodiment of the inventive concept in more detail.

FIG. 2 illustrates the D/MUX unit 120 and the 2D LCoS 140. The D/MUX unit 120 may include a first D/MUX part 121 and a second D/MUX part 122. The first D/MUX part 121 is a 1×N D/MUX, and when operated as a demultiplexer, has one input part and N output parts. The second D/MUX part 122 is a two-dimensional D/MUX, in which the 1×N D/MUXs of N are stacked. The micro lens system 130 (refer to FIG. 1) may be additionally attached to the longitudinal section of the D/MUX unit 120 to which the signal is output or the input part of the 2D LCoS 140.

An entire wavelength band of an optical multi-channel signal may be divided into M channel intervals. The optical multi-channel signal may be divided into N wavelength bands through the first D/MUX part 121. For example, the N may be 4. The second D/MUX part 122 may include stacked i-bands ($\lambda$1-band, $\lambda$2-band, $\lambda$3-band, and $\lambda$4-band) D/MUXs. The i-bands D/MUXs may be fabricated separately on the same wafer. When the D/MUX unit 120 is configured to include the first D/MUX part 121 and the second D/MUX part 122, the resolution of the optical signal waveform shaping apparatus 100 (refer to FIG. 1) may be increased by N times.

Figure 3:
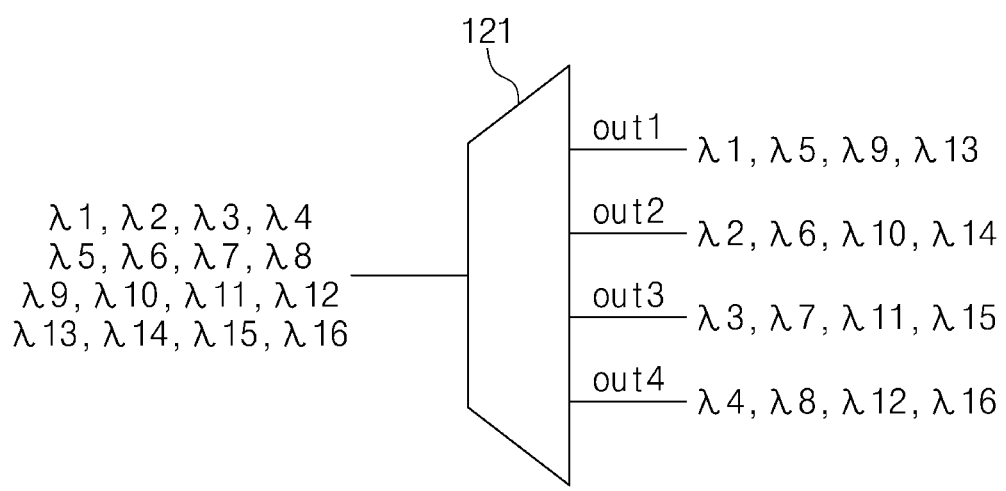
FIG. 3 illustrates in detail a demultiplexing by a first D/MUX according to an embodiment of the inventive concept.

FIG. 3 illustrates in detail a demultiplexing by a first D/MUX part according to an embodiment of the inventive concept.

In the first D/MUX part 121, wavelengths may be divided and output for each i-bands ($\lambda$1-band, $\lambda$2-band, $\lambda$3-band, and $\lambda$4-band). For example, the optical multi-channel signal ($\lambda$1, $\lambda$2, ..., $\lambda$16), where M=16, may be input and the N may be 4(N=4). In a first output terminal out1 of the first D/MUX part 121, wavelengths $\lambda$1, $\lambda$5, $\lambda$9, and $\lambda$13 may be output. A signal output from the first output terminal out1 may be input to the $\lambda$1-band of the second D/MUX part 122 (refer to FIG. 2). In a second output terminal out2 of the first D/MUX part 121, wavelengths $\lambda$2, $\lambda$6, $\lambda$10, and $\lambda$14 may be output. A signal output from the second output terminal out2 may be input to the $\lambda$2-band of the second D/MUX part 122. In a third output terminal out3 of the first D/MUX part 121, wavelengths $\lambda$3, $\lambda$7, $\lambda$11, and $\lambda$15 may be output. A signal output from the third output terminal out3 may be input to the $\lambda$3-band of the second D/MUX part 122. In a fourth output terminal out4 of the first D/MUX part 121, wavelengths $\lambda$4, $\lambda$8, $\lambda$12, and $\lambda$16 may be output. A signal output from the fourth output terminal out4 may be input to the $\lambda$4-band of the second D/MUX part 122.

Figure 4:
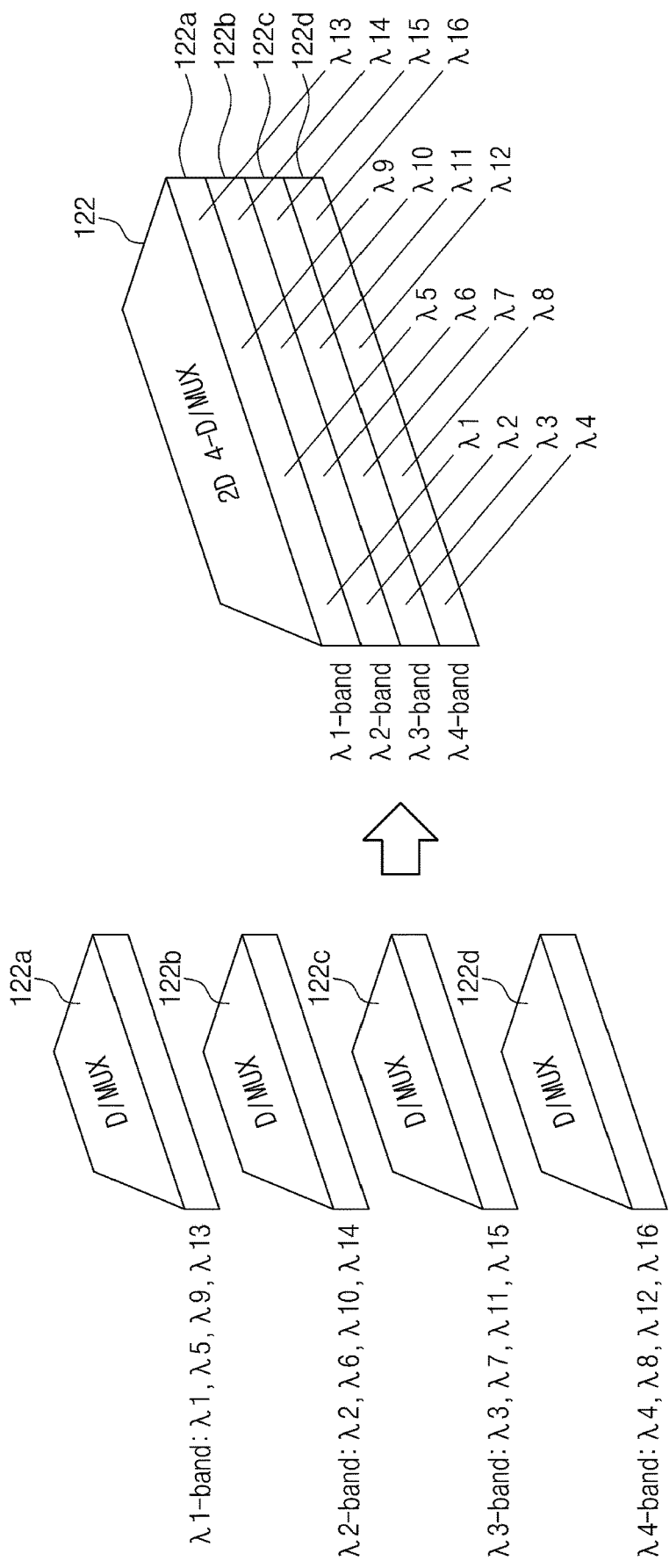
FIG. 4 illustrates in detail a demultiplexing by a second D/MUX part according to an embodiment of the inventive concept.

FIG. 4 illustrates in detail a demultiplexing by a second D/MUX part according to an embodiment of the inventive concept.

FIG. 4 is a diagram illustrating each i-bands ($\lambda$1-band, $\lambda$2-band, $\lambda$3-band, $\lambda$4-band) D/MUXs 122a, 122b, 122c, and 122d, and the second D/MUX part 122 that is formed by stacking N of the i-bands ($\lambda$1-band, $\lambda$2-band, $\lambda$3-band, $\lambda$4-band) D/MUXs 122a, 122b, 122c, and 122d according to an embodiment of the inventive concept.

As described above, referring to the embodiment of FIG. 3, when the optical signal multiplexed with 16 wavelengths $\lambda$1 to $\lambda$16 is input to the optical waveform shaping apparatus 100 (refer to FIG. 1), the wavelengths may be divided and output for each i-bands ($\lambda$1-band, $\lambda$2-band, $\lambda$3-band, and $\lambda$4-band) through the first D/MUX part 121 (refer to FIG. 3). The signal output from the first D/MUX part 121 may be input to the second D/MUX part 122.

Referring to FIG. 4, the wavelengths $\lambda$1, $\lambda$5, $\lambda$9, and $\lambda$13 may be multiplexed and input to the $\lambda$1-band. Referring to FIG. 4, the wavelengths $\lambda$1, $\lambda$5, $\lambda$9, and $\lambda$13 may be separated and output from the D/MUX 122a to which the $\lambda$1-band is assigned. As described above, when the wavelengths $\lambda$2, $\lambda$6, $\lambda$10, and $\lambda$14 are multiplexed and input to the $\lambda$2-band, the wavelengths $\lambda$2, $\lambda$6, $\lambda$10, and $\lambda$14 may be separated and output from the D/MUX 122b to which the $\lambda$2-band is assigned. When the wavelengths $\lambda$3, $\lambda$7, $\lambda$11, and $\lambda$15 are multiplexed and input to the $\lambda$3-band, the wavelengths $\lambda$3, $\lambda$7, $\lambda$11, and $\lambda$15 may be separated and output from the D/MUX 122c to which the $\lambda$3-band is assigned. When the wavelengths $\lambda$4, $\lambda$8, $\lambda$12, and $\lambda$16 are multiplexed and input to the $\lambda$4-band, the wavelengths $\lambda$4, $\lambda$8, $\lambda$12, and $\lambda$16 may be separately output from the D/MUX 122d to which the $\lambda$4-band is assigned.

In the second D/MUX part 122, N D/MUXs 122a, 122b, 122c, and 122d to which the i-bands ($\lambda$1-band, $\lambda$2-band, $\lambda$3-band, and $\lambda$4-band) are assigned, respectively, may generally be fabricated using the photolithography. In this case, it may be preferable to fabricate the N D/MUXs 122a, 122b, 122c, and 122d that constitute each of the i-bands ($\lambda$1-band, $\lambda$2-band, $\lambda$3-band, and $\lambda$4-band) on the same wafer to apply the same process conditions. When an output wavelength band of the D/MUXs 122a, 122b, 122c, and 122d that constitute the i-bands ($\lambda$1-band, $\lambda$2-band, $\lambda$3-band, and $\lambda$4-band) does not match design values, the output wavelength band may be finely adjusted using a high-power pulse laser. For example, in the case of a silica optical waveguide in which a Ge component is included in a core, an effective refractive index of the core may be changed in response to an UV range. In this case, when a target sample is hydrotreated in advance, an UV light sensitivity may be increased.

Figure 5:
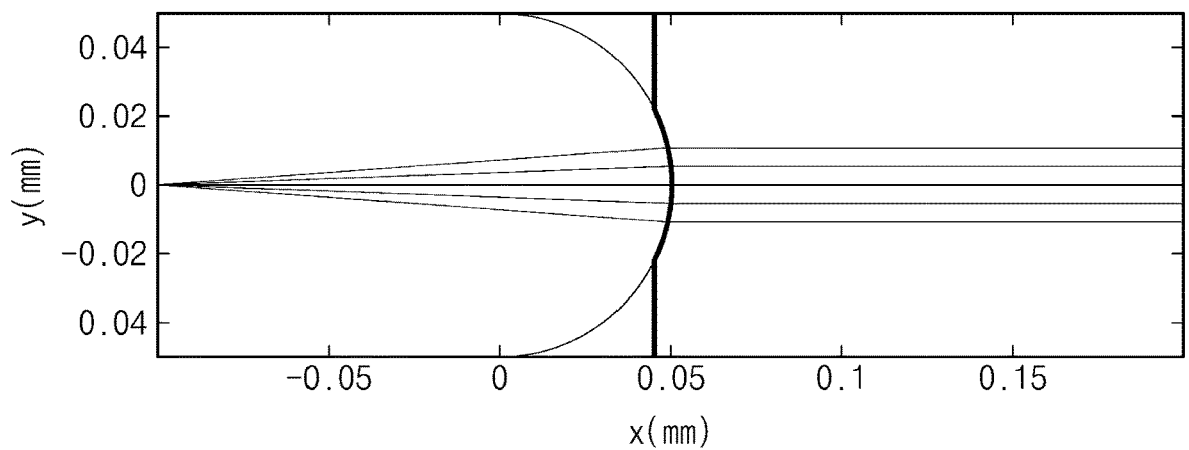
FIG. 5 illustrates a simulation result of a travel path of an optical signal by a micro lens system.

FIG. 5 illustrates a simulation result of a travel path of an optical signal by a micro lens system.

In more detail, FIG. 5 illustrates a simulation result when the micro lens system 130 of FIG. 1 (refer to FIG. 1) is composed of one micro lens. The optical signal that is demultiplexed and emitted may be converted into the collimated beam of light when passing through the micro lens system 130. Through the simulation result, it is possible to derive a condition of the micro lens for converting the emitted optical signal into the collimated beam of light. The condition of the micro lens for deriving the collimated beam of light may include parameters such as a radius of curvature, a refractive index, a lens thickness, a lens diameter, etc. In this case, the micro lens should be made uniformly with the same refractive index material. In addition, the micro lens should be made to have a suitable height such that all emitted rays of light may be converted into the collimated beam of light. For example, according to the simulation result of FIG. 5, the radius of curvature of the micro lens may be 0.05R. In this case, 0.05R means a degree of bending of a circle having a radius of 0.05 mm.

Figure 6:
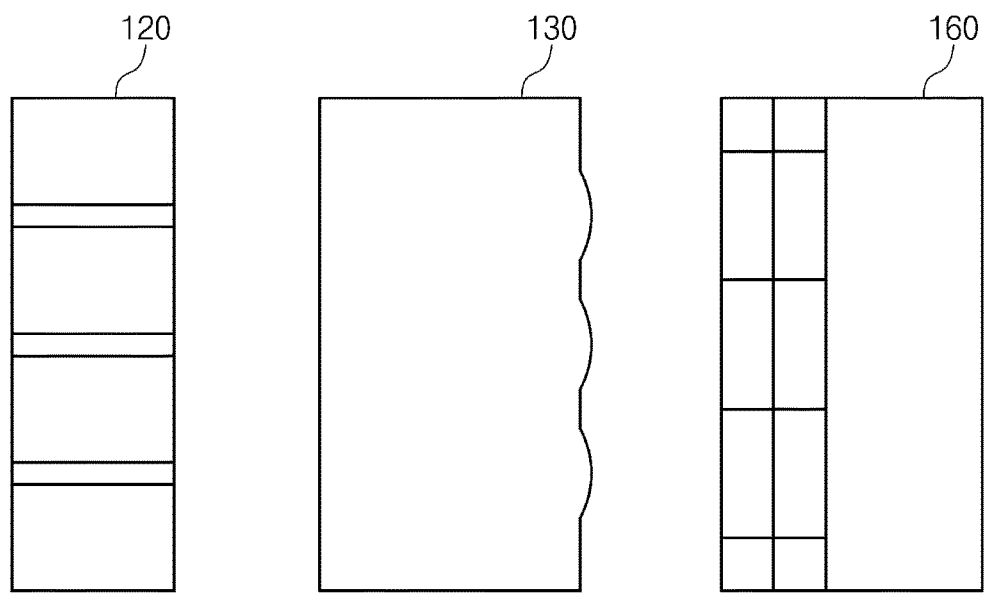
FIG. 6 illustrates a micro lens system in more detail.

FIG. 6 illustrates a micro lens system in more detail.

FIG. 6 includes arranging the D/MUX unit 120, the micro lens system 130, and the wavelength level controller unit 160 side by side in order. The micro lens system 130 may include a two-dimensional micro lens array. In the two-dimensional micro lens array, as described in FIG. 5, the parameters such as the radius of curvature, the refractive index, the lens thickness, and the lens diameter may be determined through the simulation result. Once the parameters of the two-dimensional micro lens array are determined, a two-dimensional micro lens system may be manufactured based on the parameters. The two-dimensional micro lens system may be manufactured by one of a photolithography process, a hot embossing process, and a nanoimprint process.

Figure 7:
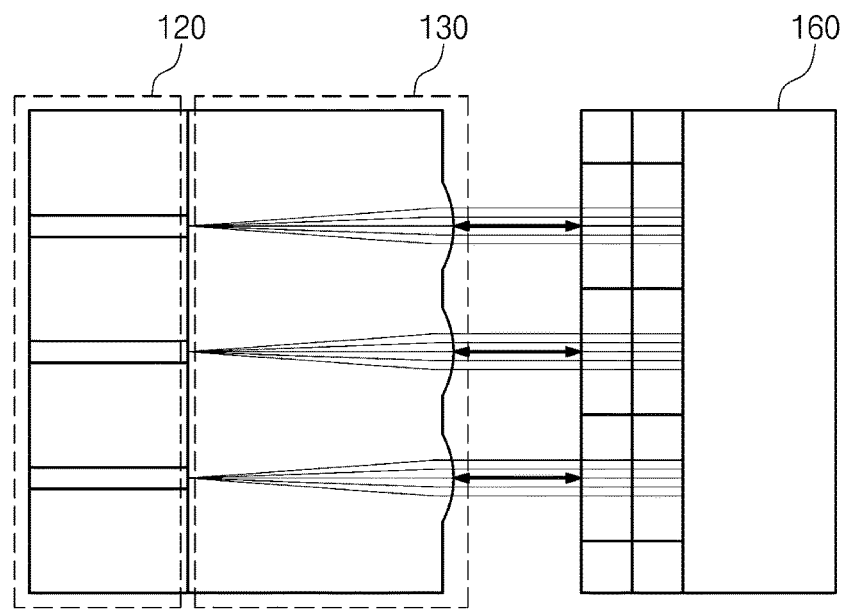
FIG. 7 illustrates a simulation result of a travel path of an optical signal when a micro lens system is attached to an output part of a D/MUX unit.

FIG. 7 illustrates a simulation result of a travel path of an optical signal when a micro lens system is attached to an output part of a D/MUX unit.

Referring to FIG. 7, the optical signal that is demultiplexed through the output part of the D/MUX unit 120 may pass through the micro lens system 130. The travel path of the demultiplexed optical signal may be changed into the collimated beam of light by refraction while passing through the micro lens array positioned at the output part of the micro lens system 130. The collimated beam of light incident on the wavelength level controller unit 160 may be shaped into a desired waveform by modifying of the distribution. The optical signal having the modified waveform may be reflected by the 2D LCoS 140 (refer to FIG. 1) and passed through the micro lens system 130, and then output through the D/MUX unit 120.

Figure 8:
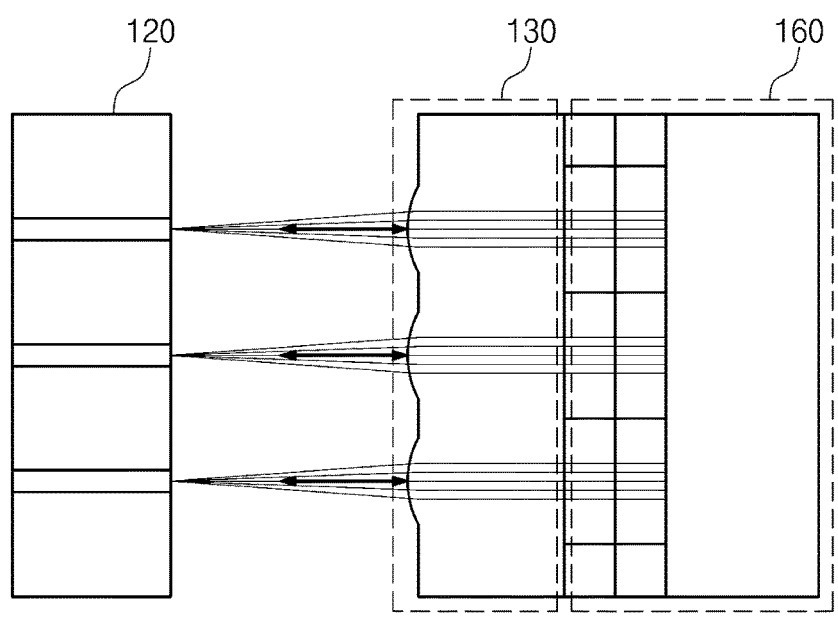
FIG. 8 illustrates a simulation result of a travel path of an optical signal when a micro lens system is attached to an input part of the 2D LCoS.

FIG. 8 illustrates a simulation result of a travel path of an optical signal when a micro lens system is attached to an input part of the 2D LCoS.

Referring to FIG. 8, the optical signal that is demultiplexed through the output part of the D/MUX unit 120 may be changed into the collimated beam of light by refraction in the travel path while passing through the micro lens array positioned at the input part of the micro lens system 130. The optical signal that is changed into the collimated beam of light may pass through the micro lens system 130 and then enter the wavelength level controller unit 160. The collimated beam of light incident on the wavelength level controller unit 160 may be shaped into a desired waveform by modifying of the distribution. The optical signal having the modified waveform may be reflected by the 2D LCoS 140 (refer to FIG. 1) and passed through the micro lens system 130, and then output through the D/MUX unit 120.

Figure 9:
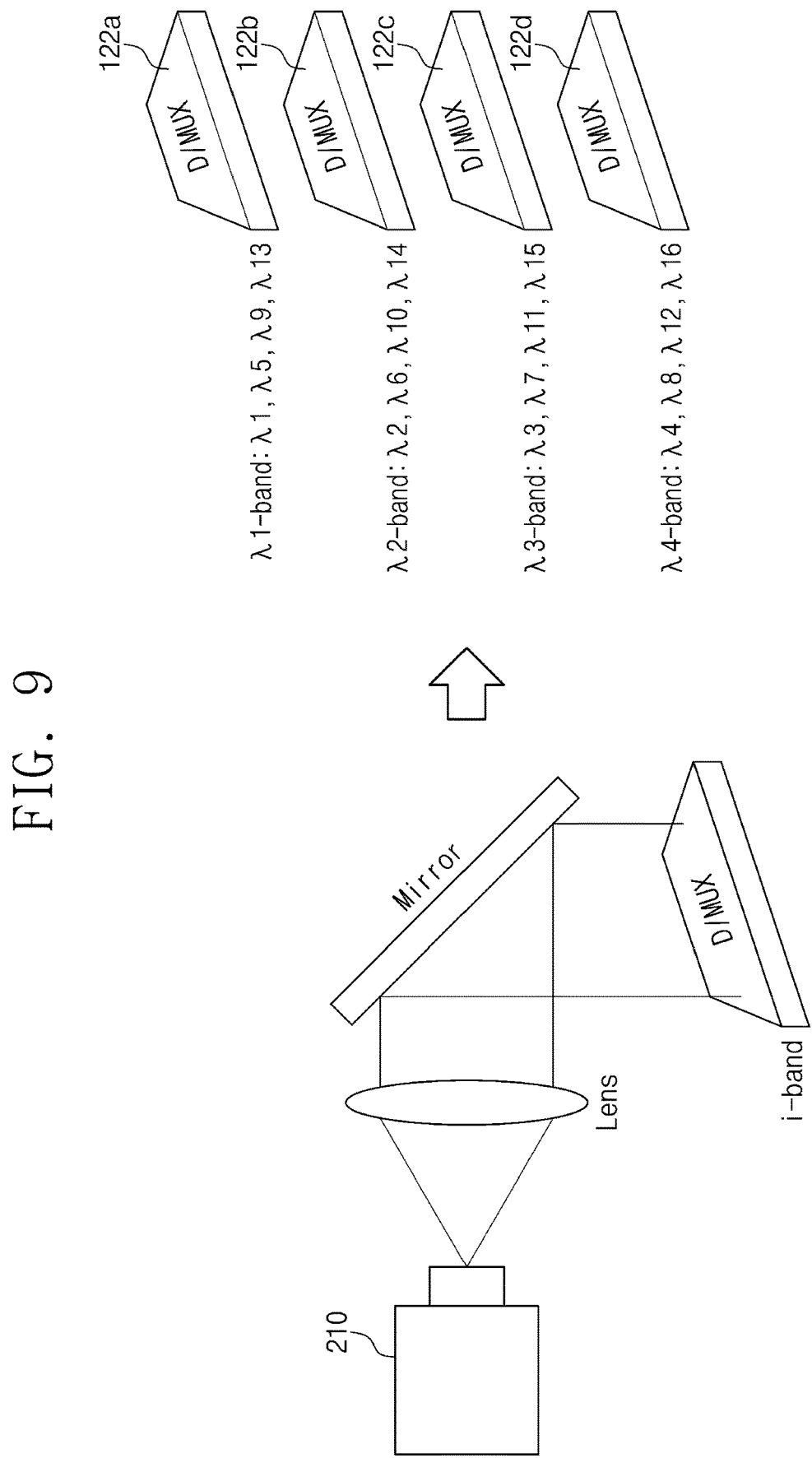
FIG. 9 illustrates an exemplary method of manufacturing a D/MUX constituting a second D/MUX part.

FIG. 9 illustrates an exemplary method of manufacturing a D/MUX constituting a second D/MUX part.

FIG. 9 illustrates a method of fabricating the D/MUXs 122a, 122b, 122c, and 122d that constitute the second D/MUX part 122 (refer to FIG. 4), using a high-power pulse laser 210. By irradiating the high-power pulse laser 210 uniformly to the optical waveguide type i-bands (λ1-band, λ2-band, λ3-band, and λ4-band) D/MUXs 122a, 122b, 122c, and 122d, output spectral characteristics may be changed. For example, when a plurality of D/MUXs 122a having the same λ1-band wavelength band are fabricated on the same wafer and then the high-power pulse laser 210 is uniformly irradiated to one of the plurality of D/MUXs 122a under suitable conditions, the D/MUX 122b having the λ2-band wavelength band may be manufactured by using the D/MUX 122a having the λ1-band wavelength band. When the high-power pulse laser 210 is uniformly irradiated to another D/MUX 122a having the λ1-band wavelength band under another suitable conditions, the D/MUX 122c having the λ3-band wavelength band may be manufactured. In the same manner, the D/MUX 122d having the M-band wavelength band may also be manufactured. Through this process procedure, D/MUXs of N constituting the second D/MUX part 122 may be manufactured.

FIG. 10 illustrates a flowchart describing an optical waveform shaping method according to an embodiment of the inventive concept.

In operation S110, the optical signal having the plurality of wavelengths may be input through the input part of the optical waveform shaping apparatus 100 (refer to FIG. 1). The input optical signal may be input to the D/MUX unit 120 (refer to FIG. 1) through the circulator 110 (refer to FIG. 1). In this case, the circulator 110 may close the output branch of the optical waveform shaping apparatus 100.

In operation S120, the input optical signal may be separated and demultiplexed for each wavelength. For example, the D/MUX unit 120 may include the first D/MUX part 121 (refer to FIG. 2) and the second D/MUX part 122 (refer to FIG. 2). The optical signal including the plurality of wavelengths that are input to the D/MUX unit 120 may be input to the first D/MUX part 121 and separated and output into N optical rays of light. Each optical ray of light may contain multiple wavelengths. The second D/MUX part 122 may have the structure in which D/MUXs of N are stacked. The N optical rays of lights output from the first D/MUX part 121 may be input to each layer of the second D/MUX part 122. Each of the optical rays of lights that are input to the each layer of the second D/MUX part 122 may be again separated and output into the plurality of optical rays of lights. Through the above-described series of processes, resolution as high as N times may be achieved.

In operation S130, the demultiplexed optical signal that is output from the D/MUX unit 120 may be refracted while passing through the micro lens system 130 (refer to FIG. 1). The travel path of the refracted optical signal may be adjusted in the collimated beam of light.

In operation S140, the collimated beam of light that is output from the micro lens system 130 may be incident to the wavelength level controller unit 160 (refer to FIG. 1). The wavelength level controller unit 160 may include the 2D LCoS 140 (refer to FIG. 1) and the controller 150 (refer to FIG. 1). The 2D LCoS 140 may be positioned at the input part of the wavelength level controller unit 160. Thus, the demultiplexed collimated beam of light may be incident on each cell of the 2D LCoS 140. Each collimated beam of light incident on the each cell of the 2D LCoS 140 may be modified into a desired distribution. The distribution may include the amplitude and the phase of the optical signal. The controller 150 may control the distribution of waveform in each cell of the 2D LCoS 140. The optical signal shaped with the desired distribution may be reflected and output through the 2D LCoS 140. In this case, the reflected optical signal may be the collimated beam of light.

In operation S150, the collimated beam of light that is reflected and output from the 2D LCoS 140 may be incident on the micro lens system 130. The collimated beam of light passing through the micro lens system 130 may be adjusted to the focused ray of light in the travel path.

In operation S160, the focused ray of light output from the micro lens system 130 may be multiplexed into one optical ray by the D/MUX unit 120. The D/MUX unit 120 that operates as a demultiplexer in operation S120 may operate as a multiplexer in operation S160 to multiplex a plurality of optical rays into a single optical ray.

In operation S170, the multiplexed optical signal may be output to the output part of the optical signal waveform shaping apparatus 100 and transmitted.

Since the optical waveform shaping apparatus according to the inventive concept uses the second D/MUX part 122 (refer to FIG. 2) as described above, it is possible to implement an optical waveform shaping apparatus having a resolution as high as N times, using a device having a low resolution characteristic. In addition, by integrating devices with multiple functions depending on the PIC, high-density, ultra-small multi-channel optical signal waveform shaping apparatus may be implemented. The inventive concept may be utilized not only as a multi-channel optical signal waveform shaping apparatus but also as a wavelength selection switch (WSS) for a WDM optical communication or an optical signal generator having an arbitrary waveform.

According to embodiments of the inventive concept, an optical waveform shaping apparatus and an optical waveform shaping method may realize a resolution as high as N times even with a device having a low resolution, by using a stacked structure of a D/MUX.

According to embodiments of the inventive concept, an optical waveform shaping apparatus may be miniaturized by using a Photonic Integrated Circuit (PIC).

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments. Therefore, the scope of the inventive concept is not limited to the described embodiments but should be defined by the claims and their equivalents.

What is claimed is:

1. An optical waveform shaping apparatus comprising:
a multiplexer/demultiplexer (D/MUX) unit to demultiplex an optical signal in which optical signals of a plurality of wavelengths are multiplexed;
a micro lens system to refract the demultiplexed optical signal into a collimated beam of light; and
a wavelength level controller unit to shape a waveform of the optical signal, and
wherein the wavelength level controller unit comprises a 2D LcoS (Liquid Crystal on Si) for adjusting an amplitude or a phase value of the demultiplexed optical signal to have a distribution that is desired for each cell and reflecting the adjusted optical signal, and a controller for controlling the distribution;
wherein the D/MUX unit includes:
a first D/MUX part to separate an optical multi-channel signal into a plurality of wavelength bands and to output the separated optical multi-channel signal; and
a second D/MUX part in which a plurality of D/MUXs respectively corresponding to the plurality of wavelength bands are stacked in layers in a same wafer, and
wherein each of the D/MUXs divides and outputs the optical multi-channel signal of each wavelength band for each wavelength.

2. The optical waveform shaping apparatus of claim 1, wherein the micro lens system is attached to an output part of the D/MUX unit.

3. The optical waveform shaping apparatus of claim 1, wherein the micro lens system is attached to an input part of the 2D LcoS.

4. The optical waveform shaping apparatus of claim 1, wherein the micro lens system includes a 2D micro lens array.

5. The optical waveform shaping apparatus of claim 1, wherein the D/MUXs constituting the second D/MUX part are formed through a photolithography process.

6. The optical waveform shaping apparatus of claim 1, wherein the D/MUXs constituting the second D/MUX part are formed by irradiating high-power pulse laser to an optical waveguide type D/MUX.

7. The optical waveform shaping apparatus of claim 4, wherein the 2D micro lens array is formed through a photolithography process.

8. The optical waveform shaping apparatus of claim 4, wherein the 2D micro lens array is formed through a hot embossing process.

9. The optical waveform shaping apparatus of claim 4, wherein the 2D micro lens array is formed through a nano-imprint process.

* * * * *